United States Patent
Baek et al.

(10) Patent No.: US 11,224,025 B2
(45) Date of Patent: Jan. 11, 2022

(54) METHOD AND APPARATUS FOR TRANSMITTING TIME INFORMATION IN MOBILE COMMUNICATION SYSTEM

(71) Applicant: Samsung Electronics Co., Ltd., Suwon-si (KR)

(72) Inventors: Sangkyu Baek, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 16/833,316

(22) Filed: Mar. 27, 2020

(65) Prior Publication Data
US 2020/0314784 A1    Oct. 1, 2020

(30) Foreign Application Priority Data
Mar. 28, 2019   (KR) .................. 10-2019-0036219

(51) Int. Cl.
*H04W 56/00* (2009.01)

(52) U.S. Cl.
CPC ... *H04W 56/0015* (2013.01); *H04W 56/0055* (2013.01)

(58) Field of Classification Search
CPC ............. H04W 56/001; H04W 56/009; H04W 56/0045; H04W 52/0206; H04W 36/08; H04W 76/27; H04W 72/042; H04W 4/40; H04W 72/14; H04W 92/18; H04W 76/14; H04W 4/50; H04W 72/044; H04W 72/1289; H04W 4/70; H04W 4/80; H04J 11/00; H04J 2011/0096; H04B 7/2696; H04B 7/2656; Y02D 30/70
See application file for complete search history.

(56) References Cited

U.S. PATENT DOCUMENTS

| | | | | |
|---|---|---|---|---|
| 2016/0192304 A1* | 6/2016 | Yi | ......................... | H04B 7/2696 370/311 |
| 2016/0344536 A1* | 11/2016 | Kumar | .................... | G06F 13/40 |
| 2018/0184362 A1* | 6/2018 | Babaei | ................. | H04W 48/16 |
| 2018/0367281 A1* | 12/2018 | Kim | ...................... | H04L 5/0098 |
| 2020/0107236 A1* | 4/2020 | Tseng | .................... | H04W 76/14 |
| 2020/0120626 A1* | 4/2020 | Sartori | ................ | H04W 56/001 |

FOREIGN PATENT DOCUMENTS

KR    10-2016-0075734 A    6/2016

OTHER PUBLICATIONS

International Search Report and Written Opinion of the International Searching Authority in connection with International Application No. PCT/KR2020/004116 dated Jul. 2, 2020, 9 pages.

(Continued)

*Primary Examiner* — Jung Liu

(57) ABSTRACT

A method performed by a terminal in a wireless communication system. The method includes receiving, from a cell of a base station including a plurality of cells connected to the terminal, time information including a reference system frame number (SFN) of a reference cell and performing communication with the base station based on the received time information.

3 Claims, 12 Drawing Sheets

(56) References Cited

OTHER PUBLICATIONS

Ericsson, "CR for Late drop capabilities," R2-1902680, 3GPP TSG-RAN2 Meeting #105, Athens, Greece, Feb. 25-Mar. 1, 2018, 913 pages.
3GPP TS 36.331 V15.4.0 (Dec. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Dec. 2018, 933 pages.

* cited by examiner

METHOD AND APPARATUS FOR TRANSMITTING TIME INFORMATION IN MOBILE COMMUNICATION SYSTEM

CROSS-REFERENCE TO RELATED APPLICATION

This application is based on and claims priority under 35 U.S.C. § 119 to Korean Patent Application No. 10-2019-0036219 filed on Mar. 28, 2019 in the Korean Intellectual Property Office, the disclosure of which is incorporated by reference herein in its entirety.

BACKGROUND

1. Field

The disclosure relates to a method and apparatus for transmitting time information in a mobile communication system.

2. Description of Related Art

To meet the soaring demand with respect to wireless data traffic because of the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. For higher data transmission rates, implementation of 5G communication systems in ultra-high frequency bands (mm-Wave), such as, e.g., 60 GHz, is being considered. In 5G communication systems, beamforming, massive multi-input multi-output (MIMO), full dimensional MIMO (FD-MIMO), array antenna, analog beamforming, and large-scale antenna technologies have been discussed as ways of alleviating propagation path loss and increasing propagation distances in ultra-high frequency bands. To improve system networks, in 5G communication systems, various technologies have been developed, such as, evolved or advanced small cell, cloud radio access network (cloud RAN), ultra-dense network, device-to-device (D2D) communication, wireless backhaul, moving network, cooperative communication, coordinated multi-point (CoMP), and interference cancellation. Also, for 5G systems, other technologies have been developed, such as, hybrid frequency-shift keying (FSK) and quadrature amplitude modulation (QAM) modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication technology such as a sensor network, M2M, MTC, etc., has been implemented by a scheme such as beamforming, MIMO, array antennas, and so forth. The application of cloud RAN as a Big Data processing technology may also be an example of the convergence of 3eG technology and IoT technology.

SUMMARY

Provided is a method and apparatus for transmitting time information in a mobile communication system.

Additional aspects will be set forth in part in the description which follows and, in part, will be apparent from the description, or may be learned by practice of the presented embodiments of the disclosure.

According to an embodiment of the disclosure, a method, performed by a terminal, in a wireless communication system includes: receiving, from a cell of a base station including a plurality of cells connected to the terminal, time information including a reference system frame number (SFN) of a reference cell; and performing communication with the base station based on the received time information.

The time information may include a time of a start or end boundary of a frame with the reference SFN.

The reference cell may include a Primary Cell (PCell) essentially connected to the base station.

The receiving of the time information may include receiving the time information via a Radio Resource Control (RRC) message or a System Information (SI) message.

The method may further include: receiving time information of other base station from the base station, the time information including at least one of base station identification information and cell identification information; and performing communication with the other base station based on the received time information of the other base station.

According to an embodiment of the disclosure, a method, performed by a base station, in a wireless communication system includes: transmitting, to a terminal, via a cell among a plurality of cells connected to the terminal, time information including a reference system frame number (SFN) of a reference cell; and performing communication with the terminal based on the received time information.

The time information may include a time of a start or end boundary of a frame with the reference SFN.

The reference cell may include a Primary Cell (PCell) essentially connected to the base station.

The transmitting of the time information may include: transmitting the time information via a Radio Resource Control (RRC) message or a System Information (SI) message.

The method of may further include: receiving time information of the other base station from the other base station, the time information including at least one of base station identification information and cell identification information; and transmitting, to the terminal, the time information of the other base station.

According to an embodiment of the disclosure, a terminal in a wireless communication system includes: a transceiver; a memory; and a processor configured to receive, from a cell of a base station including a plurality of cells connected to the terminal, time information including a reference system frame number (SFN) of a reference cell, and perform communication with the base station based on the received time information.

The time information may include a time of a start or end boundary of a frame with the reference SFN.

The reference cell may include a Primary Cell (PCell) essentially connected to the base station.

The processor may be configured to receive the time information via a Radio Resource Control (RRC) message or a System Information (SI) message.

The processor may be further configured to receive time information of other base station from the base station, the time information including at least one of base station identification information and cell identification information, and perform communication with the other base station based on the received time information of the other base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
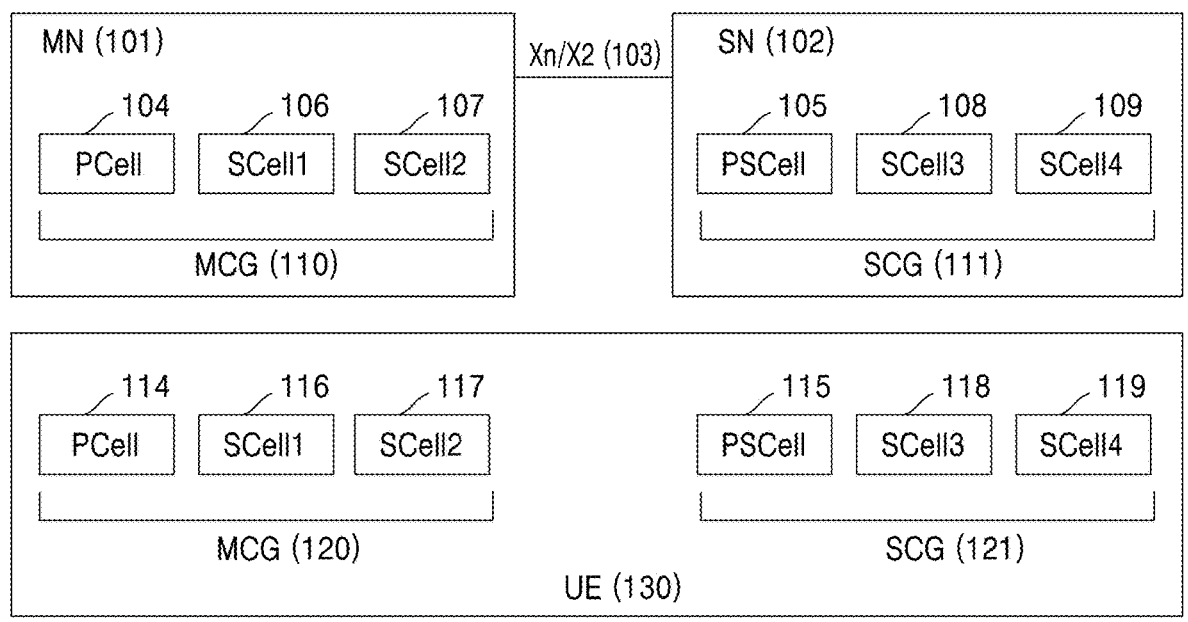
FIG. 1 illustrates a dual connectivity structure between a base station and a user equipment (UE) in a wireless communication system.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be disclosed with reference to the accompanying drawings. When embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reason, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the embodiments of the disclosure, but may be implemented in various manners, and the embodiments of the disclosure are provided to complete the disclosure of the disclosure and to allow those of ordinary skill in the art to understand the scope of the disclosure. The disclosure is defined by the category of the claims. Throughout the specification, an identical reference numeral will indicate an identical element.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

The term '~unit' used herein refers to software or a hardware element such as a field-programmable gate array (FPGA), an application specific integrated circuit (ASIC), etc., and '~unit' plays specific roles. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card. In the embodiments of the disclosure, '~unit' may include one or more processors.

As used in the following description, a term for identifying an access node, terms referring to network entities, terms referring to messages, a term referring to an interface between network objects, and terms referring to various identification information are illustrated for convenience of explanation. Therefore, the disclosure is not limited by the following terms, and other terms indicating targets having equivalent technical meanings may be used.

Hereinbelow, for convenience of a description, the disclosure employs terms and names defined in the $3^{rd}$-Generation Partnership Project Long Term Evolution (3GPP LTE) standards or terms and names changed based on them. However, the disclosure is not limited by such terms and names, and may be equally applied to systems complying with other standards. In particular, the disclosure may be applied to the 3GPP New Radio (NR) ($5^{th}$-generation mobile communication standards). The present disclosure can be applied to smart services (e.g. smart homes, smart buildings, smart cities, smart cars or connected cars, health care, digital education, retail businesses, security- and safety-related services and the like) on the basis of 5G communication technology and IoT-related technology.

Hereinbelow, the base station is an entity that performs resource assignment of the terminal, and may be at least one of gNode B, an evolved Node B (eNode B), Node B, a base station (BS), a wireless access unit, a base station controller, or a node on a network. The terminal may include a user equipment (UE), a mobile station (MS), a cellular phone, a smartphone, a computer, or a multimedia system capable of performing communication functions. However, this is merely an example, and the base station and the terminal are not limited to the examples. In the disclosure, an evolved NodeB (eNB) may be used interchangeably with a gNB. That is, the base station described as the eNB may indicate the gNB. In the disclosure, the term 'terminal' may indicate not only a cellular phone, NB-IoT, and sensors, but also various wireless communication devices.

FIG. 1 illustrates a dual connectivity structure between a base station and a UE 130 in a wireless communication system.

Referring to FIG. 1, the UE 130 may have a dual connectivity structure in which the UE 130 is connected to two base stations, i.e., network, nodes. In the dual connectivity structure, the base station may include two base station nodes 101 and 102 that may be connected through an X2 interface or Xn interface 103. Among the base station nodes, a node mainly connected to the UE 130 may be referred to as a master node (MN) 101 and a node secondarily connected for the dual connectivity structure may be referred to as a secondary node (SN) 102. The MN 101 may be an anchor point of a signaling radio bearer (SRB) 1 indicating radio resource control (RRC) configuration of the UE 130 and an SRB 2 transmitting a non-access stratum (NAS) message for establishing connection between the UE 130 and a core network. Each node may communicate with the UE 130 by being connected through one or more cells which may be classified as a primary cell (PCell) 104 essentially connected to the MN 101, a primary secondary cell (PSCell) 105 essentially connected to the SN 102, and secondary cells (SCell) 106, 107, 108, and 109 secondarily included in the respective nodes. Among them, cells managed by the MN 101 will be collectively referred to as a master cell group (MCG) 110, and cells managed by the SN 102 will be collectively referred to as a secondary cell group (SCG) 111. In the same manner, the UE 130 may perform transmission with the base station through a PCell 114, a PSCell 115, and additional SCells 116, 117, 118, and 119. In this case, the PCell 114, the PSCell 115, and the respective SCells 116, 117, 118, and 119 may not be physically different from those of the base station, and may be resources of the corresponding same frequency bands. Thus, the MSG 120 and the SCG 121 may be provided, and this configuration may be made in the same manner during connection between the base station and the UE 130.

Figure 2:
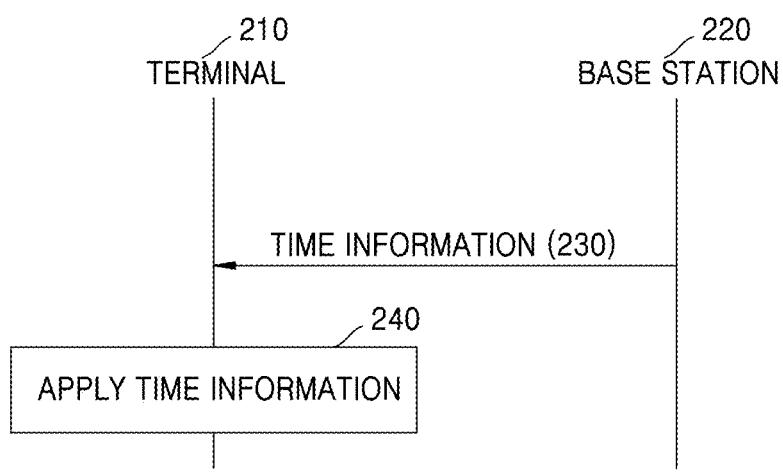
FIG. 2 is a diagram illustrating a process, performed by a base station, of transmitting time information to a terminal, according to an embodiment of the disclosure.

FIG. 2 is a diagram illustrating a process, performed by a base station 220, of transmitting accurate time information to a terminal 210, according to an embodiment of the disclosure.

Referring to FIG. 2, the terminal 210 may need to obtain accurate time information for an operation in a communication system so as to operate in connection with an ultra reliable and low latency communication (URLLC) service or a time sensitive network (TSN). The time information can be accurate to several nanoseconds (ns) to several hundreds of nanoseconds; and unless the accuracy is not guaranteed, the quality of service (QoS) requirements in the URLLC service or the TSN may not be satisfied.

Thus, the terminal 210 may receive accurate time information from the base station 220 in operation 230. In an embodiment of the disclosure, the time information may include a time used in a communication network accessed and used by the terminal 210. The time information may coincide with a time provided by a specific satellite or may include a time having a difference within an allowable error range. In an embodiment of the disclosure, when the time information includes the time used in the communication network, a reference time point may be needed to determine a time at which time point is the time information. In an embodiment of the disclosure, the reference time point may be an ending boundary of a specific cell indicated by a system frame number (SFN), a slot number, or a symbol number. That is, the time information may include reference time point information to be indicated by the time information, and a time at a reference time point. Moreover, uncertainty indicating sophistication of the time information may be transmitted through the time information.

In an embodiment of the disclosure, upon reception of the time information, the terminal 210 may accurately determine a time of a communication system the terminal 210 is accessing by applying the time information, in operation 240. In this case, the terminal 210 may apply the reference time point at a time point when the base station 220 transmits the time information, or may apply the reference time point at a time point when the terminal 210 transmits a message.

In an embodiment of the disclosure, the terminal 210 may receive the time information from the base station 220 through a time information message. However, without being limited thereto, the terminal 210 may receive the time information from the base station 220 through various methods, for example, via another message or a form other than a message.

Figure 3:
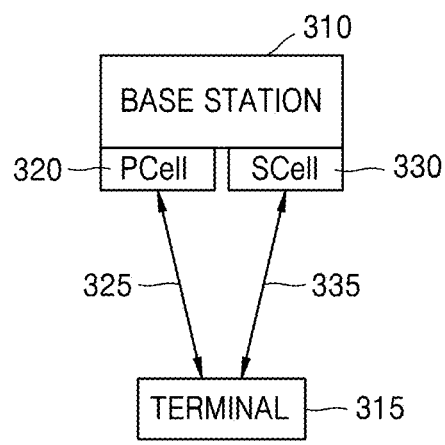
FIG. 3 is a diagram illustrating a case where a time difference occurs between cells in a base station at a reference time point.

FIG. 3 is a diagram illustrating a case where a time difference occurs between cells in a base station 310 at a reference time point.

The base station 310 may manage multiple cells 320 and that may be classified as a PCell 320, an SCell 330, and a PSCell. A time at which each cell actually operates in the base station 310 may vary due to a restriction of a position of a module of the cell, etc. As a result, a start time or an end time of a frame or a symbol may differ between cells. Moreover, an error may occur due to a propagation time during which each cell performs transmission to a terminal 315. Referring to FIG. 3, a propagation time error may occur due to a difference between a path 325 for communication between a PCell 320 and the terminal 315 and a path 335 for communication between an SCell 330 and the terminal 315. An operation time difference between cells may not largely affect transmission/reception operations, but may have an influence upon URLLC traffic or a TSN protocol. Thus, an error based on a time difference is reduced. To this end, information of a cell indicated by the reference time point of the time information described with reference to FIG. 2 is indicated separately.

Figure 4:
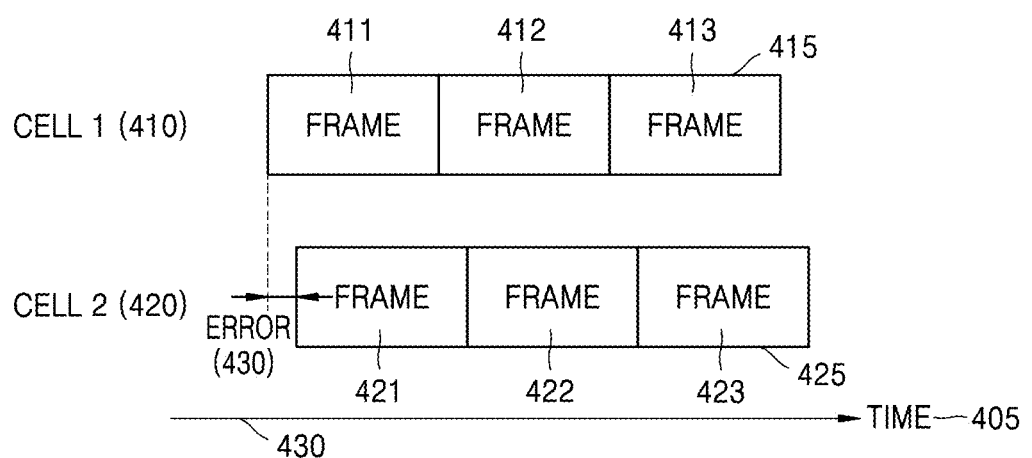
FIG. 4 is a diagram illustrating a case where a start time point and an end time point of a frame differ between cells.

FIG. 4 is a diagram illustrating a case where a start time point and an end time point of a frame differ between cells. Referring to FIG. 4, a total of two cells, Cell 1 410 and Cell 2 420 will be described as an example, but a difference may also occur for three or more cells. In a time axis 405 of FIG. 4, Cell 1 410 may include frames 411, 412, and 413, and Cell 2 420 may include frames 421, 422, and 423. In this case, an error 430 in frame synchronization recognizable by a terminal may occur due to the error based on the operation time difference between cells or the propagation time difference between cells described with reference to FIG. 3. As described with reference to FIG. 2, a base station may notify time information to a terminal, and this information may include information indicating which end point of SFN of a cell among Cell 1 410 and Cell 2 420 is indicated by the time information. For example, a point 415 of Cell 1 410 or point 425 of Cell 2 420 may be designated as a reference time point, which may indicate that an end point of the frame 411 is a reference time point by designating an SFN of the frame 411. In another embodiment of the disclosure, a start point of a frame indicated by SFN may be a reference time point. In another embodiment of the disclosure, a symbol and a slot number may be included such that a start point or an end point of the symbol or the slot may indicate the reference time point.

Figure 5:
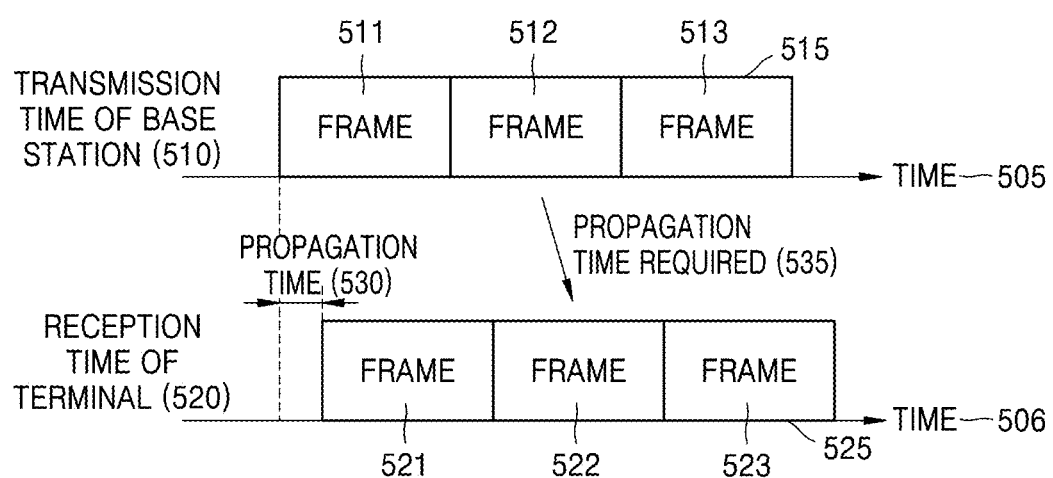
FIG. 5 is a diagram illustrating a case where a difference occurs between a transmission time of a base station and a reception time of a terminal in each cell.

FIG. 5 is a diagram illustrating a case where a difference occurs between a transmission time of a base station and a reception time of a terminal in each cell.

Referring to FIG. 5, time used for transmission of radio electric waves from a transmission device to a reception device may increase in proportional to a distance that the electric waves are transmitted. In this case, the speed of propagation may be assumed to be generally the speed of light. Thus, a time difference in the same reference time point occurs between the transmission device and the reception device due to a propagation time between the transmission device and the reception device. Due to existence of a propagation time 530, a time difference may occur between a transmission time 510 of transmission from the base station in a downlink on a time axis 505 and a reception time 520 of reception by the terminal in the downlink on a time axis 506. Thus, a difference occurs between frames 511, 512, and 513 based on a time for transmission by the base station 510 and frames 521, 522, and 523 based on a time for reception by the terminal 520. The point 515 and the point 525 can be analogous to the point 415 and the point 425, respectively.

As described with reference to FIG. 2, when the base station delivers time information of a reference time point to the terminal, whether to use a transmission time of the base station or a reception time of the terminal as a reference can be set. To accurately process the time information based on the set reference, an error between the two times has to be corrected. For example, to use the transmission time of the base station as a reference, the base station may indicate to the terminal, a difference between the reception time of the terminal and the transmission time of the base station, i.e., information of the propagation time 530 from the base station to the terminal. This information may be included in the time information message described with reference to FIG. 2 or may be transmitted through a separate message. In an embodiment of the disclosure, a timing advance (TA) value is used for transmission by advancing the reception time by a certain time when the terminal transmits a message in an uplink, and a half of the TA value may be used as the difference between the transmission time of the base station and the reception time of the terminal. To use the reception time of the terminal as a reference, the base station may consider propagation time to the terminal in advance and transmit a result 535 of adding the propagation time 530 to the actual transmission time through the time information. Information about whether to use the transmission time of the base station or the reception time of the terminal may be transmitted through the time information message. Regardless of whether the transmission time of the base station or the reception time of the terminal is used, the terminal may update the time information based on an end point or a start point of a frame or a slot indicated by the base station.

Figure 6:
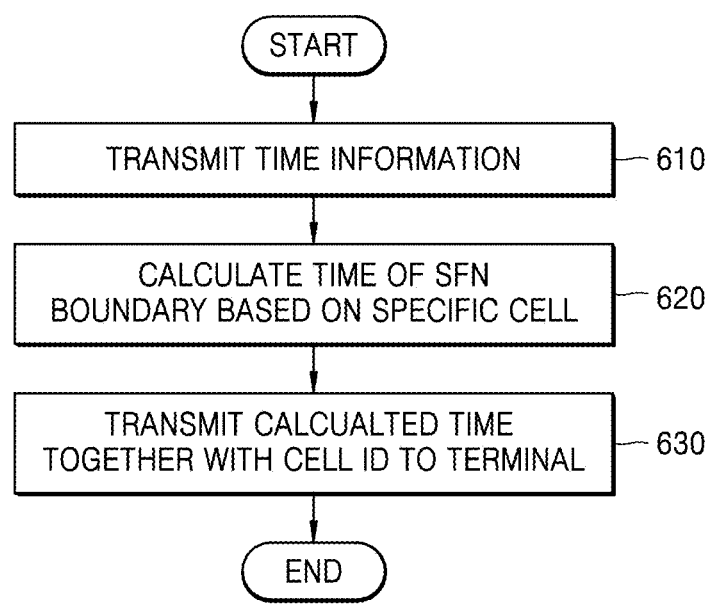
FIG. 6 is a flowchart illustrating an operation, performed by a base station, of transmitting time information, according to an embodiment of the disclosure.

FIG. 6 is a flowchart illustrating an operation, performed by a base station, of transmitting time information, according to an embodiment of the disclosure. When the base station has to transmit the time information to a terminal in operation 610, the base station may transmit the time information to a target terminal by using a unicast radio resource control (RRC) message or to multiple unspecific terminals capable of reception within a transmission range of the base station by using a broadcast system information message. When the base station transmits the time information, an accurate reference time point indicated by the time information is indicated. To this end, a time of a start or end boundary of a particular SFN based on a specific cell may be calculated in operation 620. Thereafter, the calculated time may be transmitted, together with an identifier of the cell, to the terminal in operation 630. In this case, the identifier of the cell may be an SCell index. For a PCell, an identifier may not be included or index 0 may be used. In the dual connectivity structure, a cell group identifier for identifying a cell of an MCG or a cell of an SCG may be included. In an embodiment of the disclosure, a physical cell identifier (PCI), which is a physical layer cell ID used in a physical layer, may be used.

In an embodiment of the disclosure, the base station may transmit time information through a cell other than a reference cell. However, even in this case, the time information may include information about the reference cell, not about the cell transmitting the time information. For example, when the reference cell is a PCell, the time information may be transmitted to the terminal through one of the PCell and an SCell. In this case, when the base station transmits the time information through the PCell, the time information may be time information of the PCell that is the reference cell, and even when the base station transmits the time information through the SCell, the time information may be the time information of the PCell that is the reference cell.

Figure 7:
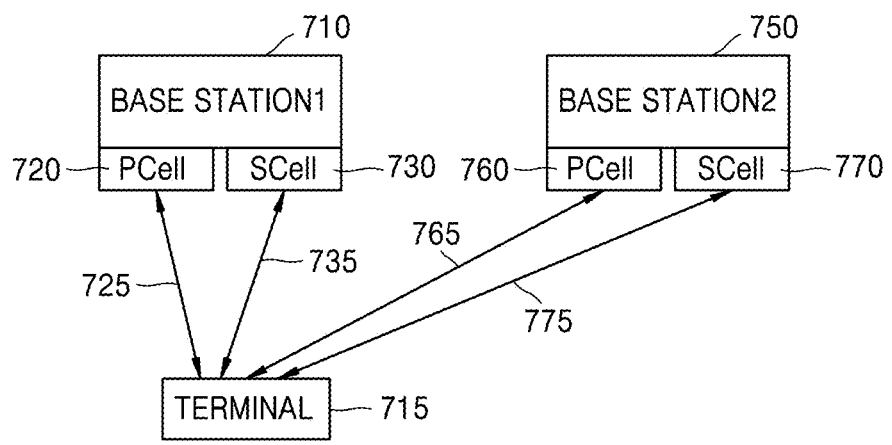
FIG. 7 is a diagram illustrating a case where a time difference occurs between base stations at a reference time point.

FIG. 7 is a diagram illustrating a case where a time difference occurs between first and second base stations 710 and 750 at a reference time point.

Referring to FIG. 7, a terminal may be connected to one base station, but may also be connected to two base stations in the dual connectivity structure. In addition, the terminal may also perform a handover to another base station in spite of being connected with one serving base station. The first and second base stations 710 and 750 may be installed in physically different locations, which may mean that times managed by the two first and second base stations 710 and 750 are basically different from each other. The first and second base stations 710 and 750 may manage multiple cells 720, 730, 760, and 770 that may be classified as PCells 720 and 760, SCells 730 and 770, a PSCell, etc. A time in which each cell actually operates in each of the first and second base stations 710 and 750 may vary due to a restriction of a position of a module of the cell, etc. As a result, a start time or an end time of a frame or a symbol may differ between cells. Moreover, an error may occur due to a propagation time in transmission to the terminal in each cell. In FIG. 7, a propagation time difference may occur because a path 725 for communication between the PCell 720 of the first base station 710 and a terminal 715, a path 735 for communication between the SCell 730 of the first base station 710 and the terminal 715, a path 765 for communication between the PCell 760 of the second base station 750 and the terminal 715, and a path 775 for communication between the SCell 770 of the second base station 750 and the terminal 715 are partially different from one another. An operation time difference between base stations and between cells may not largely affect transmission/reception operations, but may have an influence upon URLLC traffic or a TSN protocol. Thus, an error based on a time difference is reduced. To this end, information of a base station and a cell indicated by the reference time point of the time information described with reference to FIG. 2 is indicated separately. In an embodiment of the disclosure, a serving base station may indicate time information for a target base station before a handover starts.

Figure 8:
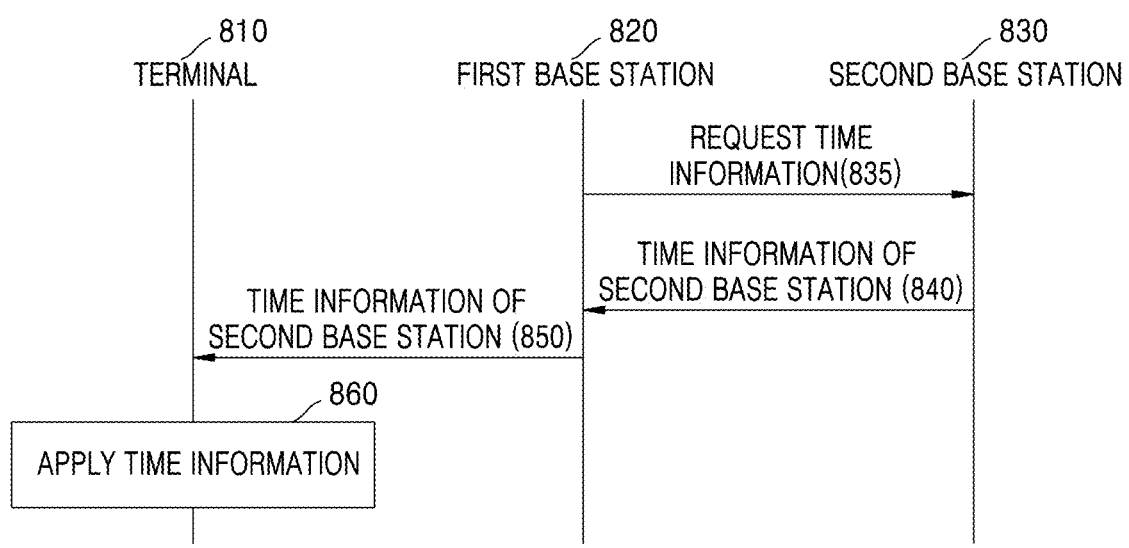
FIG. 8 is a diagram illustrating a process of transmitting time information of another base station, according to an embodiment of the disclosure.

FIG. 8 is a diagram illustrating a process of transmitting time information of another base station, according to an embodiment of the disclosure.

In an embodiment of the disclosure shown in FIG. 8, a state is assumed in which connection between a terminal 810 and a first base station 820 is established and the terminal 810 is capable of receiving time information from the first base station 820. However, connection of the terminal 810 with a second base station 830 may be scheduled for dual connection or a handover, etc. In this case, the terminal 810 may receive time information of the second base station 830 to prepare for processing of URLLC traffic or an operation of a TSN protocol through connection with the second base station 830. Thus, the first base station 820 may request the second base station 830 for time information in operation 835. A request may be transmitted by adding a time information request to a handover request message transmitted in a handover preparation process. Thereafter, the second base station 830 may transmit the time information used by the second base station 830 to the first base station 820 in operation 840. In this case, the second base station 830 may indicate a reference time point used therein and a cell corresponding to the reference time point. The first base station 820 may notify the time information of the second base station 830 delivered from the second base station 830 to the terminal 810 in operation 850. This message may indicate a cell corresponding to the time information and a base station corresponding to the cell. To this end, the message may include a PCI. In addition, the time information transmitted by the second base station 830 may be equally transmitted to the terminal 810. Upon receipt of time information of another base station, the terminal 810 may update a corresponding value and directly apply the time information or may access a corresponding base station and apply stored time information in operation 860.

The time information of the other base station may be delivered when a handover to the other base station is prepared or the handover is performed. For example, when an information element (IE) of time information of a serving base station is TimingReferenceInfo, time information of a target base station may be referred to as TimingReferenceInfoTarget, and the IE may include time information of a base station that is to perform handover. The time information of the target base station may be transmitted through a handover command message, which is a message for the handover, an RRC reconfiguration message including mobility control information, or a reconfiguration with sync message, etc.

In an embodiment of the disclosure, the time information of the other base station may be delivered through system information. In this case, each TimingReferenceInfo IE may be identified by a PCI or a base station ID, such that time information of one or more other base stations may be transmitted.

Figure 9:
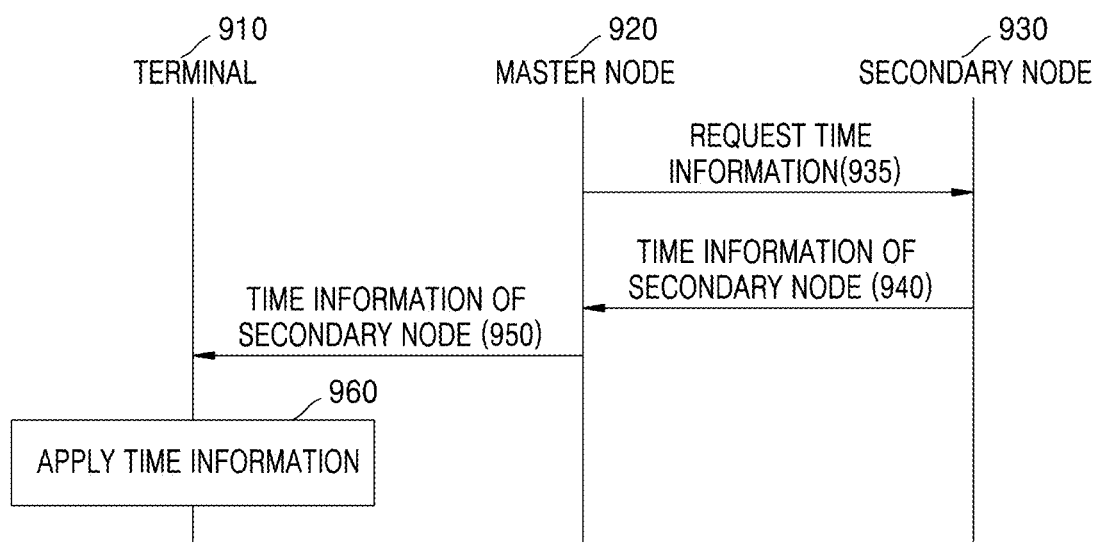
FIG. 9 is a diagram illustrating a process of transmitting time information of a secondary node in a dual connectivity structure, according to an embodiment of the disclosure.

FIG. 9 is a diagram illustrating a process of transmitting time information of a SN 930 in a dual connectivity structure, according to an embodiment of the disclosure.

Referring to FIG. 9, a state may be assumed in which connection of a terminal 910 with an MN 920 and the SN 930 is established and the terminal 910 is capable of receiving time information from the MN 920. However, in dual connection of the terminal 910, time information of the SN 930 may be used. The terminal 910 may prepare for processing of URLLC traffic or an operation of a TSN protocol through connection with the SN 930 by using the time information of the SN 930. Thus, the MN 920 may request the SN 930 for time information of the SN 930, in operation 935. In an embodiment of the disclosure, the request for the time information may be included in an SN addition request message transmitted in SN addition of the SN 930. Thereafter, the SN 930 may transmit the time information used by the SN 930 to the MN 920, in operation 940. In this case, a reference time point used by the SN 930 and a cell corresponding to the reference time point may be indicated. In an embodiment of the disclosure, the cell used by the SN 930 may be a PSCell at all times. The MN 920 may indicate the time information of the SN 930 delivered from the SN 930 to the terminal 910, in operation 950. This message may indicate a cell of the SN 930, which corresponds to the time information. To this end, the message may include an SCell index and a PCI of the SN 930. When the message uses the same message as used in transmission of the time information of the MN 920, the message may include a cell group identifier indicating a cell group or a node corresponding to the time information. In addition, the time information transmitted by the SN 930 may be equally transmitted to the terminal 910. Upon receipt of the time information of the SN 930, the terminal 910 may update a corresponding value and directly apply the time information or may access the SN 930 and apply stored time information in operation 960.

The time information of the SN 930 may also be delivered together with the time information of the MN 920 (?). When an IE of the time information of the MN 920 is TimingReferenceInfo, the time information of the SN 930 may be referred to as TimingReferenceInfoSecondary, and this IE may include time information to be used in communication by connection with the SN 930.

Figure 10:
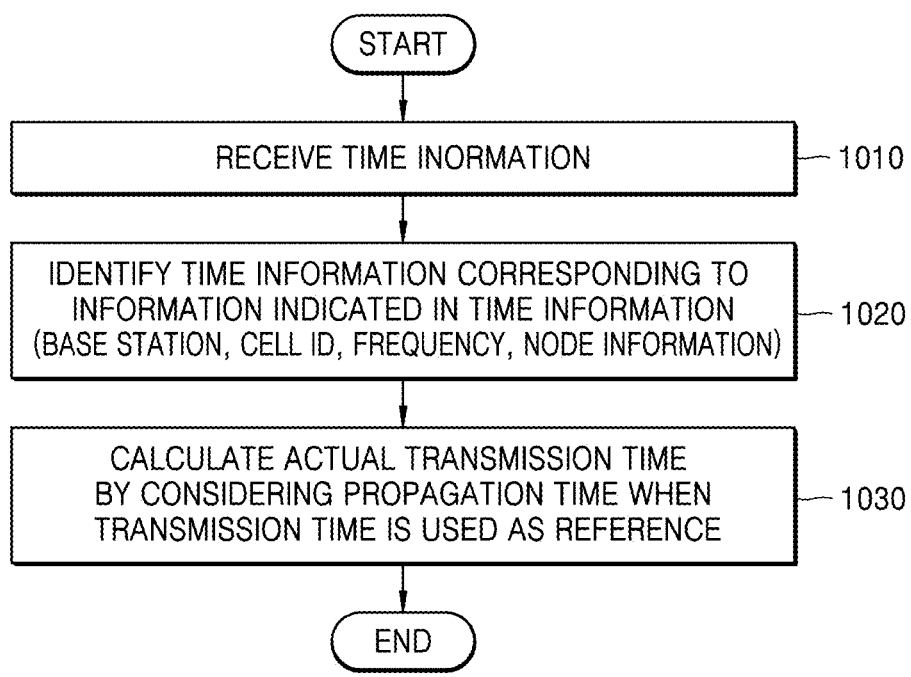
FIG. 10 is a flowchart illustrating an operation, performed by a terminal, of receiving and processing time information, according to an embodiment of the disclosure.

FIG. 10 is a flowchart illustrating an operation, performed by a terminal, of receiving and processing time information, according to an embodiment of the disclosure.

As described above, the terminal may receive time information from a base station in operation 1010. The terminal may receive time information from the base station through a unicast RRC message or through a broadcast system information message. When the base station transmits the time information, an accurate reference time point indicated by the time information is indicated. To this end, the base station indicating the reference time point indicated by the time information, the cell ID, frequency information, node information (an MN or an SN in the dual connectivity structure), etc., may be included. The terminal identifies corresponding information of the time information message in operation 1020. When the time information uses the transmission time of the base station as a reference, the terminal may calculate the actual transmission time by considering the propagation time in operation 1030. For example, the transmission time may be a result of subtracting the propagation time from the reception time.

Figure 11:
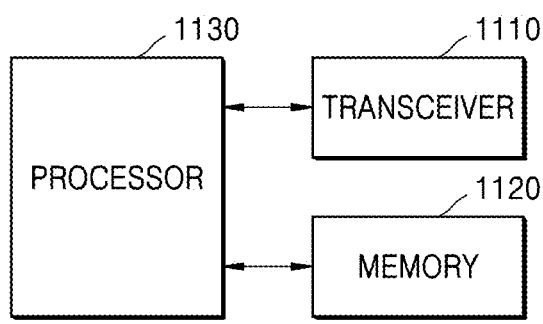
FIG. 11 illustrates a block diagram of a structure of a base station, according to an embodiment of the disclosure.

FIG. 11 illustrates a block diagram of a structure of a base station, according to an embodiment of the disclosure.

Referring to FIG. 11, the base station may include a transceiver 1110, a memory 1120, and a processor 1130. The processor 1130, the transceiver 1110, and the memory 1120 of the base station may operate according to the above-described communication method of the base station. However, components of the base station are not limited to the above-described example. For example, the base station may include more or fewer components than the above-described components. Moreover, the processor 1130, the transceiver 1110, and the memory 1120 may be implemented in a single chip form.

The transceiver 1110 may collectively refer to a receiver and a transmitter of the base station and transmit and receive a signal to and from the terminal. The signal transmitted and received to and from the terminal may include control information and data. To this end, the transceiver 1110 may include an RF transmitter that up-converts and amplifies a frequency of a transmission signal and an RF signal that low-noise-amplifies a received signal and down-converts a frequency. However, this is merely an example of the transceiver 1110, components of which are not limited to the RF transmitter and the RF receiver.

The transceiver 1110 may receive a signal through a radio channel and output the received signal to the processor 1130, and transmit a signal output from the processor 1130 through the radio channel.

The memory 1120 may store programs and data used for an operation of the base station. The memory 1120 may also store control information or data included in a signal obtained by the base station. The memory 1120 may include a storage medium such as read only memory (ROM), random access memory (RAM), hard-disk, compact disc (CD)-ROM, digital versatile disc (DVD), etc., or a combination thereof.

The processor 1130 may control a series of processes such that the base station operates according to the above-described embodiment of the disclosure. The processor 1130 may also include at least one processor.

Figure 12:
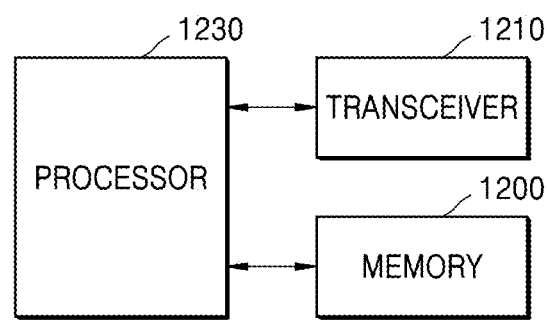
FIG. 12 illustrates a block diagram of a structure of a terminal, according to an embodiment of the disclosure.

FIG. 12 illustrates a block diagram of a structure of a terminal, according to an embodiment of the disclosure.

Referring to FIG. 12, the terminal may include a transceiver 1210, a memory 1220, and a processor 1230. The processor 1230, the transceiver 1210, and the memory 1220 of the terminal may operate according to the above-described communication method of the terminal. However, components of the terminal are not limited to the above-described example. For example, the terminal may include more or fewer components than the above-described components. Moreover, the processor 1230, the transceiver 1210, and the memory 1220 may be implemented in a single chip form.

The transceiver 1210 may collectively refer to a receiver and a transmitter of the terminal and transmit and receive a signal to and from the base station. The signal transmitted and received to and from the base station may include control information and data. To this end, the transceiver 1210 may include an RF transmitter that up-converts and amplifies a frequency of a transmission signal and an RF signal that low-noise-amplifies a received signal and down-converts a frequency. However, this is merely an example of the transceiver 1210, components of which are not limited to the RF transmitter and the RF receiver.

The transceiver 1210 may receive a signal through a radio channel and output the received signal to the processor 1230, and transmit a signal output from the processor 1230 through the radio channel.

The memory 1220 may store programs and data used for an operation of the terminal. The memory 1220 may also store control information or data included in a signal obtained by the terminal. The memory 1220 may include a storage medium such as read only memory (ROM), random access memory (RAM), hard-disk, compact disc (CD)-ROM, digital versatile disc (DVD), etc., or a combination thereof.

The processor 1230 may control a series of processes such that the terminal operates according to the above-described embodiment of the disclosure. The processor 1230 may also include at least one processor.

The methods according to the embodiments of the disclosure described in the claims or specification of the disclosure may be implemented by hardware, software, or a combination thereof.

When the methods are implemented by software, a computer-readable storage medium or a computer program product having stored therein one or more programs (software modules) may be provided. The one or more programs stored in the computer-readable storage medium or computer program product may be configured for execution by one or more processors in an electronic device. The one or more programs include instructions that cause the electronic device to execute the methods according to the embodiments of the disclosure described in the claims or the specification of the disclosure.

These programs (software modules and software) may be stored in random access memories (RAMs), non-volatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

In the detailed embodiments of the disclosure, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

Meanwhile, the embodiments of the disclosure disclosed in the present specification and drawings have been provided to easily describe the disclosure and to help with the understanding of the disclosure, and are not intended to limit the scope of the disclosure. In other words, it is apparent to one of ordinary skill in the art that various changes may be made thereto without departing from the scope of the disclosure. In addition, the embodiments of the disclosure may be used in combination. For example, an embodiment of the disclosure may be combined with some parts of another embodiment of the disclosure. In addition, other modifications based on the technical spirit of the above-described embodiment of the disclosure may also be carried out in other systems, e.g., an LTE system, a 5G system, an NR system, etc.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:

receiving, from a base station, time information including a reference system frame number (SFN) of a Primary Cell (PCell) of the base station and a time of an ending boundary of a frame indicated by the reference SFN, via a Radio Resource Control (RRC) message; and performing communication with the base station based on the received time information.

2. A method performed by a base station in a wireless communication system, the method comprising:

transmitting, to a terminal, time information including a reference system frame number (SFN) of a Primary Cell (PCell) of the base station and a time of an ending boundary of a frame indicated by the reference SFN, via a Radio Resource Control (RRC) message; and performing communication with the terminal based on the transmitted time information.

3. A terminal in a wireless communication system, the terminal comprising:
 a transceiver;
 a memory; and
 a processor configured to:
  receive, from a base station, time information including a reference system frame number (SFN) of a Primary Cell (PCell) of the base station and a time of an ending boundary of a frame indicated by the reference SFN, via a Radio Resource Control (RRC) message, and
  perform communication with the base station based on the received time information.

* * * * *